Oct. 12, 1926.

C. KNOWLES 1,602,680

AUTOMATIC CYLINDRICAL GRINDING MACHINE

Filed Sept. 9, 1922    9 Sheets-Sheet 1

INVENTOR
Carroll Knowles
BY
Joseph K. Schofield
ATTORNEY

Oct. 12, 1926.

C. KNOWLES 1,602,680

AUTOMATIC CYLINDRICAL GRINDING MACHINE

Filed Sept. 9, 1922    9 Sheets-Sheet 3

Oct. 12, 1926.

C. KNOWLES 1,602,680

AUTOMATIC CYLINDRICAL GRINDING MACHINE

Filed Sept. 9, 1922    9 Sheets-Sheet 5

INVENTOR
Carroll Knowles
BY
Joseph H. Schofield
ATTORNEY

Oct. 12, 1926.  
C. KNOWLES  
1,602,680  
AUTOMATIC CYLINDRICAL GRINDING MACHINE  
Filed Sept. 9, 1922  9 Sheets-Sheet 6

INVENTOR.  
Carroll Knowles  
BY Joseph K. Schofield  
ATTORNEY.

Oct. 12, 1926.
C. KNOWLES
1,602,680
AUTOMATIC CYLINDRICAL GRINDING MACHINE
Filed Sept. 9, 1922    9 Sheets-Sheet 7
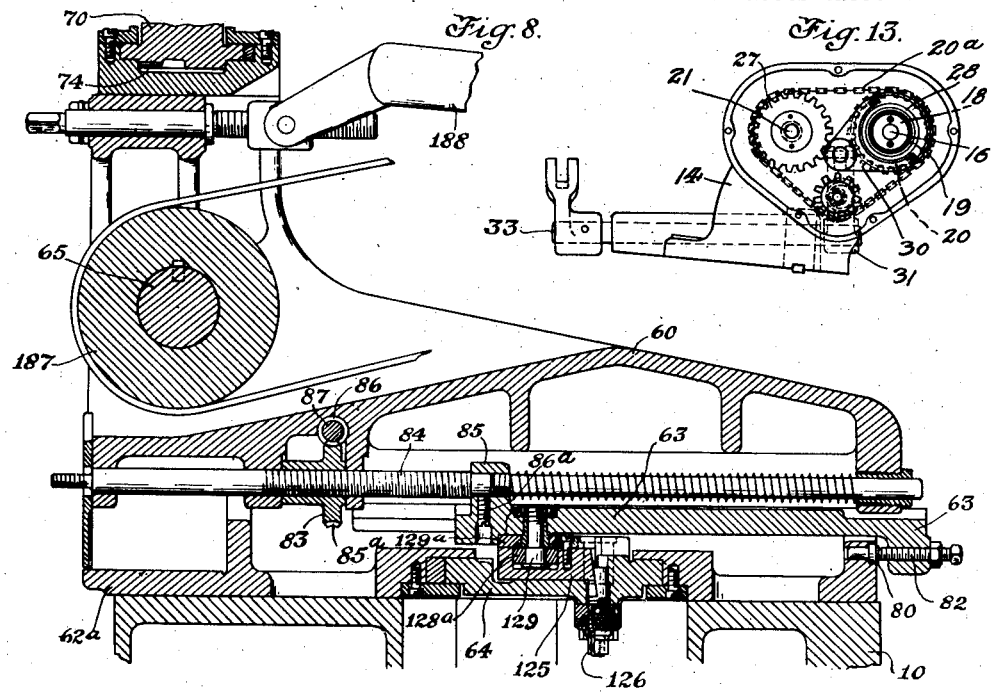
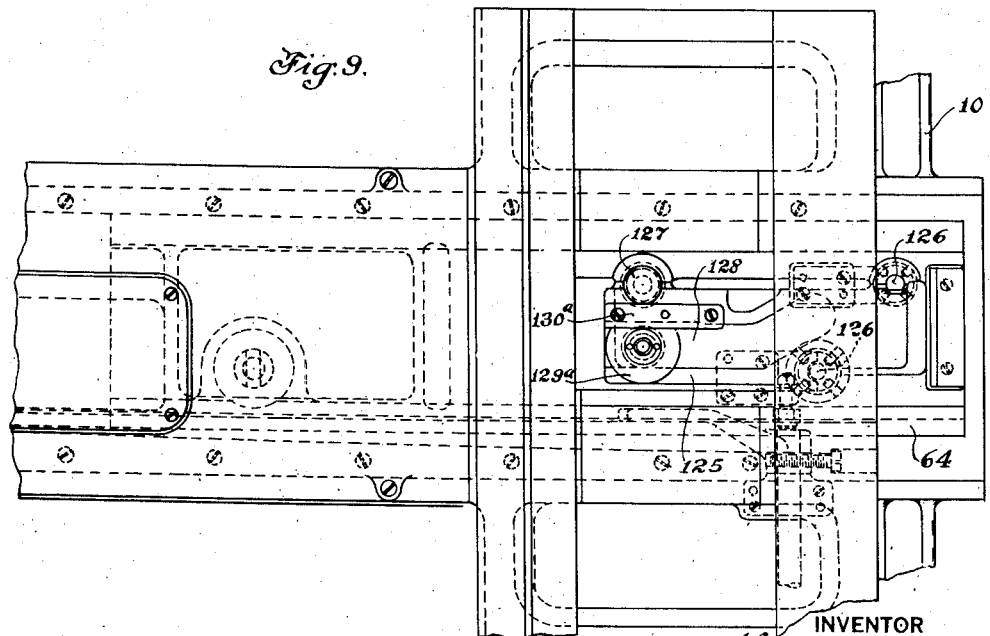
INVENTOR
Carroll Knowles
BY
Joseph K. Schofield
ATTORNEY Oct. 12, 1926.

C. KNOWLES 1,602,680

AUTOMATIC CYLINDRICAL GRINDING MACHINE

Filed Sept. 9, 1922    9 Sheets-Sheet 8

INVENTOR
Carroll Knowles.
BY
Joseph N. Schofield
ATTORNEY

Oct. 12, 1926.
C. KNOWLES
1,602,680
AUTOMATIC CYLINDRICAL GRINDING MACHINE
Filed Sept. 9, 1922   9 Sheets-Sheet 9
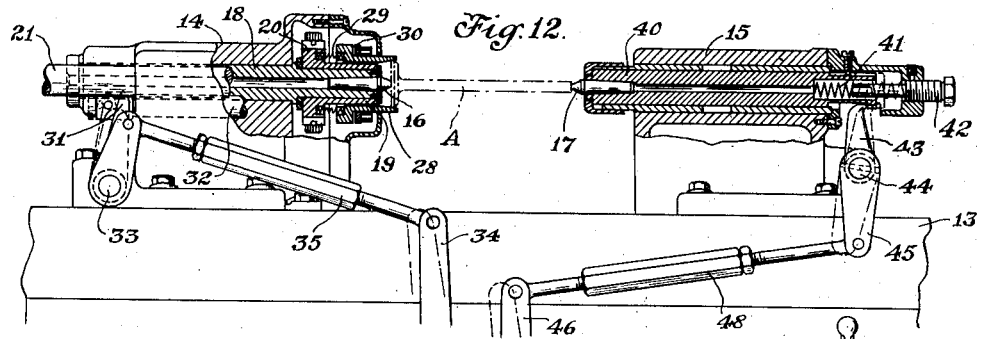
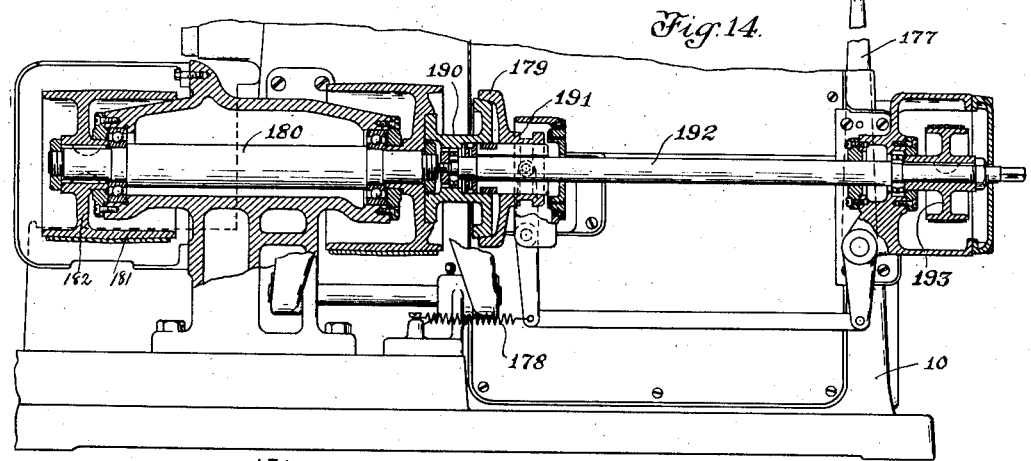
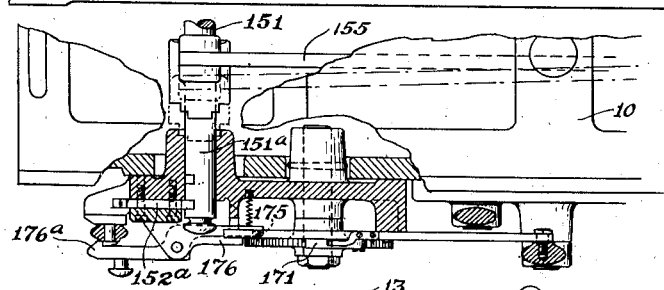
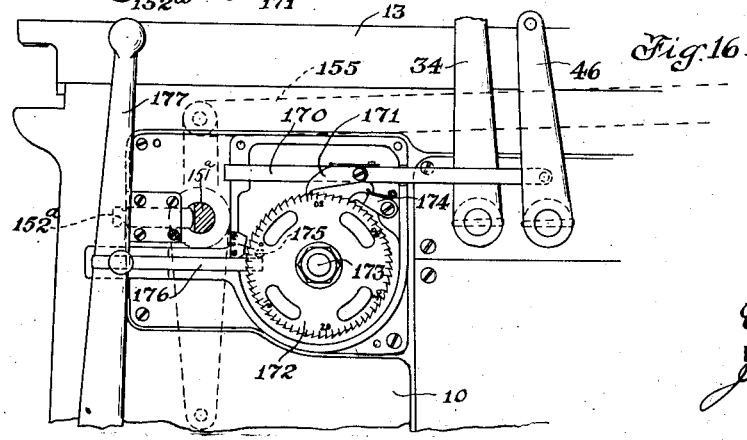
INVENTOR
Carroll Knowles
BY
Joseph W. Schofield
ATTORNEY Patented Oct. 12, 1926.

1,602,680

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

AUTOMATIC CYLINDRICAL GRINDING MACHINE.

Application filed September 9, 1922. Serial No. 587,158.

This invention relates to an automatic machine for grinding cylindrical articles and in particular the machine is adapted to grind one or more concentric cylindrical surfaces extending over a large portion of the width of the articles being ground. Also, the machine described and illustrated is especially adapted for operating successively on large numbers of similar small parts, such as valve stems, which may be supported and rotated upon centers.

An object of the present invention is to provide an improved fully automatic grinding machine adapted to automatically position articles to be ground upon work supporting and rotating means, automatically advance and feed a grinding wheel toward the axis of rotation of the work, then after a period of time during which the wheel may continue to engage the work, automatically withdraw the tool from engagement with the work and release the article from the work supporting centers.

One of the features of the invention enabling me to accomplish the above object is that I provide a rotatable blank supporting magazine, which may be filled with a plurality of articles to be ground and, during each cycle of operation of the machine, I advance or rotate the magazine slightly to a position permitting engagement of one of the articles by a suitable transfer mechanism to carry the article into operative position to be engaged by the work supporting and rotating means.

Another object of the invention is to provide a fully automatic work engaging and rotating means which preferably comprises a sleeve surrounding one of the centers adapted to engage a conical or other concentric portion of the article being ground. This rotating means is preferably permitted to have a slight floating action so that it may adjust itself on the work and permit rotation of the work about fixed work supporting centers.

Another object of the invention is to provide a special form of wheel actuating and controlling device which will permit the wheel, together with the head upon which it is mounted, to be advanced toward the work in a direction precisely normal to the axis of rotation of the work and to a precise predetermined position. Also to adapt the wheel head to be adjusted relative to its operating mechanism so that wheels of different diameters may be used or work of different character may be operated upon in the machine by suitable adjustments of the head relative to the reciprocating slides forming part of the operating mechanism.

Another object of the invention is to provide automatic stopping mechanism which may be set to stop further operation of the machine after any predetermined number of articles have been ground. This feature of the invention I employ so that a number of articles may be ground automatically without attention of the operator, but, after a predetermined number of articles have been completed, the machine may be automatically stopped thus advising the operator that any adjustments should be made or the blank magazine refilled before additional blanks are operated on.

Another object of the invention is to provide a main cam shaft having thereon a large drum on which are a plurality of cam strips or grooves. Each of these cam strips or grooves may be adapted to operate one of the mechanisms of the machine so that each mechanism is adapted to be operated precisely in predetermined timed relation to the operation of the other mechanisms, and, with each complete rotation of the cam drum, one cycle of operation of the machine and operation on one of the work blanks is completed.

A further principal object of the present invention is to provide a full automatic broad wheel grinder which may be used to grind cylindrical articles to predetermined accurate diameters and which will be durable, readily adjusted to work of different character, not easily put out of order, and one which may be operated with a minimum of supervision.

A further feature of the invention is that I provide a back rest or support for the articles being ground to retain them accurately in position and I also provide means, preferably connected to the wheel slide, for automatically withdrawing the back rest when the completed blank is being removed and a new one inserted. Preferably, also the back rest may be associated with an electrically operated sizing device adapted to operate a mechanical feeding mechanism for the wheel to compensate for wearing away of the wheel and adapted to operate when the completed blanks are not ground precisely to a predetermined size.

A still further object of the invention is to provide means to energize the wheel feeding mechanism of the sizing device momentarily during each cycle of operation so that movement of the work engaging member toward and from the work when moving with the back rest during the blank changing operation will not affect its operation.

With these and other objects in view, my invention consists in the features of construction and operation set forth in the following specification and illustrated in the accompanying drawings.

In the accompanying drawings annexed hereto and forming a part of this specification, I have shown my invention embodied in a grinding machine for the stems of poppet valves such as are commonly used in automobile engines, but it will be understood that the invention can be otherwise embodied and that the drawings are not to be construed as defining or limiting the scope of the invention, the claims appended to this specification being relied upon for that purpose.

In the drawings:

Fig. 8 is a vertical sectional view taken through the wheel head and its operating mechanism.

Fig. 9 is a plan view of the wheel operating mechanism, the wheel head being removed.

Fig. 12 is a vertical sectional view through the axis of retation of the work, parts being removed to more clearly show the construction.

Fig. 13 is a side elevation of the work rotating means.

Fig. 14 is a rear elevation in section through the main driving shaft.

Fig. 15 is a plan view partly in section of the controlling means for the wheel feeding mechanism.

Fig. 16 is an elevation partly in section of the same.

Fig. 17 is a detail of the main cam shaft and electrical contact for operating the automatic feed.

Figure 1:
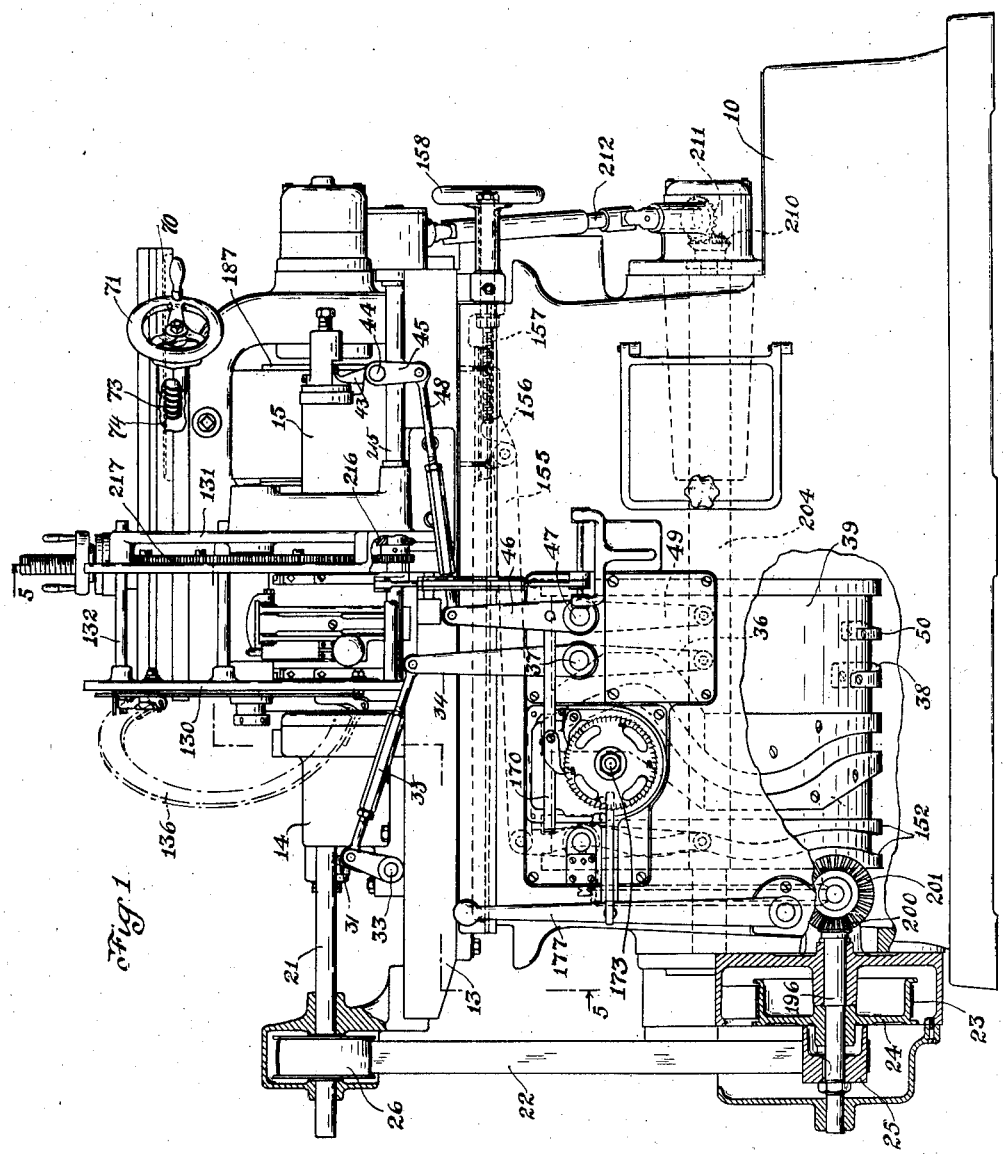
Figure 1 is a front elevation of a complete machine made in accordance with the present invention.
Figure 2:
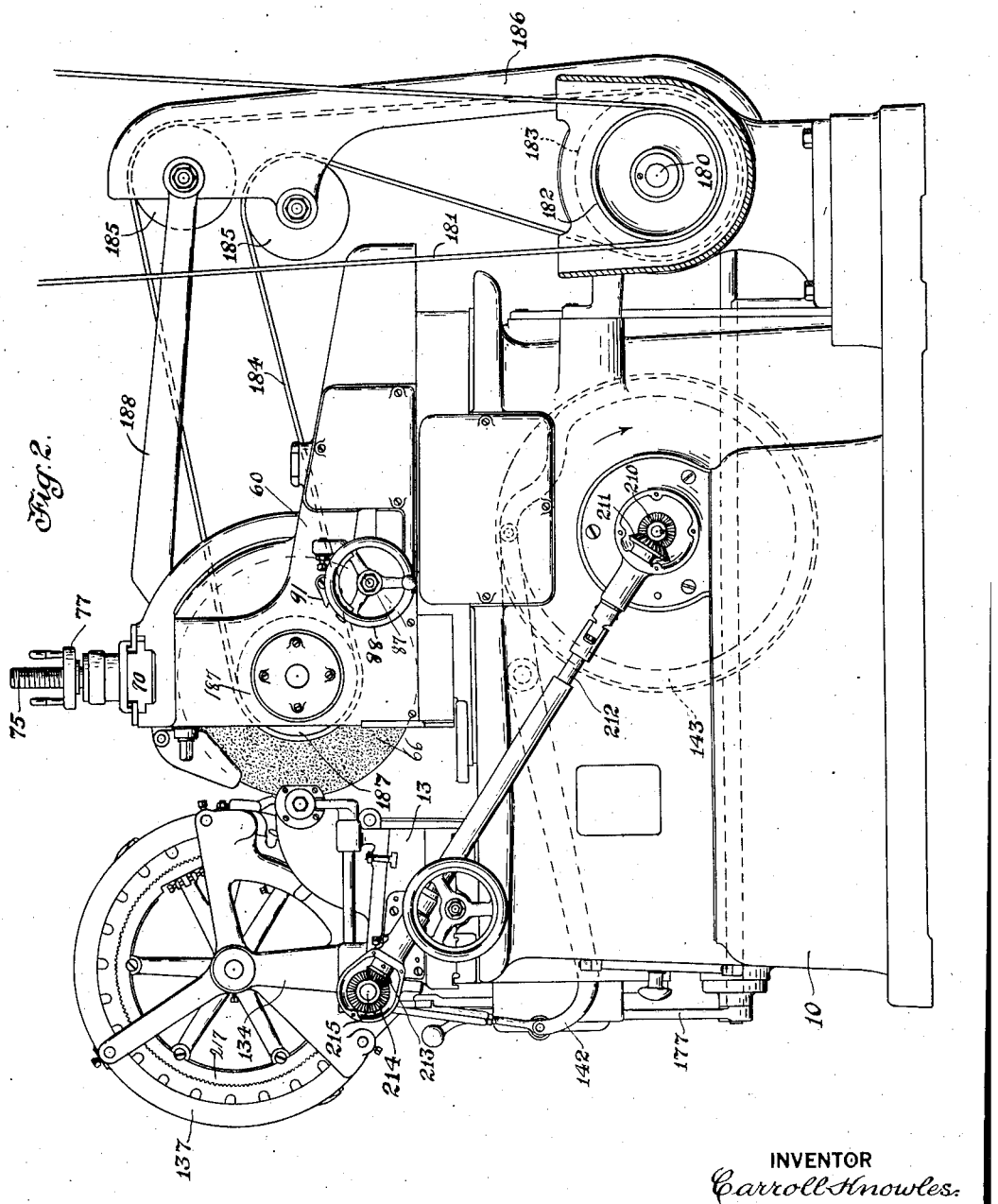
Fig. 2 is a view of the complete machine taken from the right end of the machine as seen in Fig. 1.
Figure 3:
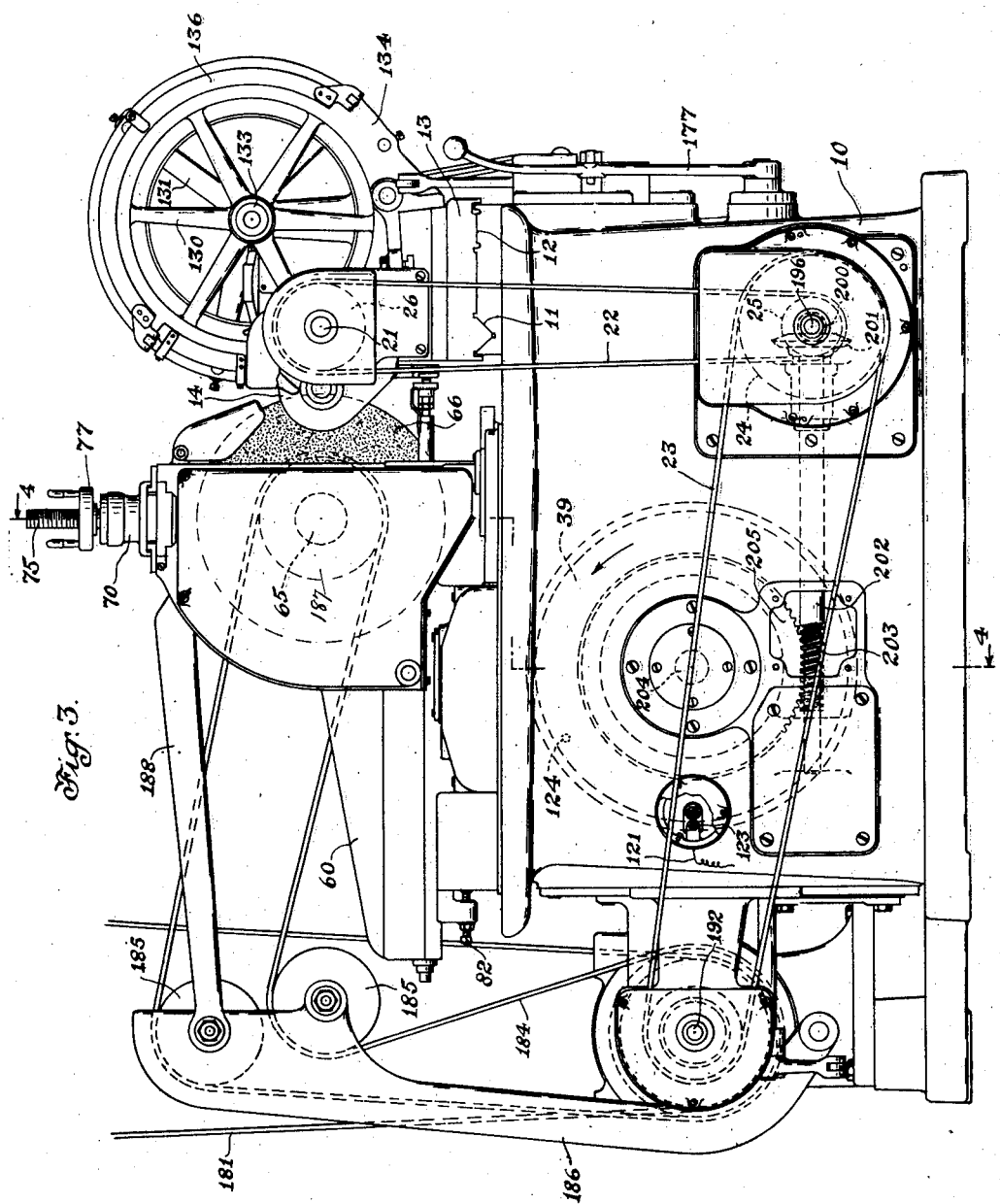
Fig. 3 is an end elevation of the complete machine as seen from the left of Fig. 1.

In the above mentioned drawings, I have shown but one modification of the invention which is now deemed preferable but it is to be understood that changes and modifications may be made within the scope of the appended claims without departing from the spirit of the invention.

Briefly, my invention in its broadest aspect comprises the following principal parts; first, a base; second, a work supporting table slidably mounted on said base; third, a wheel head having a grinding wheel rotatably mounted thereon and movable in a direction at right angles to the movement of the table; fourth, means for supporting and rotating work mounted on said table; fifth, a main cam shaft and a cam drum thereon having cam paths adapted for operating mechanism for engaging the work rotating means and for operating means by which the table is reciprocated, the wheel advanced toward and removed from the work, and the work positioning means operated to transfer work blanks from a blank holding magazine to operative position on the work supporting and rotating means; sixth, a movable work support or back rest on the table between the work supporting centers adapted to be moved into and out of operation by movement of the wheel slide; and seventh, a sizing device to maintain the work to predetermined precise diameters.

Referring more in detail to the figures of the drawings, my machine comprises a base 10, the upper surface of which is provided with longitudinally extending ways 11 and 12 upon which the table 13 may be slidably mounted. On this table 13 at one end is a headstock 14, which may be fixed in position thereon, and a tailstock 15 preferably adjustable along the table 13 to support work of different lengths. Both the headstock 14 and tailstock 15 carry fixed centers 16 and 17 respectively as shown in Fig. 12 upon which the work may be rotatably mounted. Within the headstock 14 and surrounding the headstock center 16 and spindle 18, I mount a rotatable sleeve 19 providing means by which the work is rotated. On this sleeve 19 is a sprocket wheel 20 by means of which the sleeve 19 may be rotated from any convenient source of power such as a driving shaft 21 adjacent thereto. The driving means for this sleeve 19 comprise a shaft 21 driven through any appropriate driving means, such as belts 22 and 23 and pulleys 24, 25 and 26 at one side of the base 10 which will be referred to more fully hereafter. These continuously rotate the horizontal driving shaft 21 lying adjacent the work supporting spindle 18. This shaft 21 at one end carries a sprocket wheel 27 in alignment with the sprocket wheel 20 on the work rotating sleeve 19. Passing around these sprocket wheels is a driving chain 20ª shown diagrammatically in Fig. 13.

Surrounding the work rotating sleeve 19 is a collar 28 splined thereto, springs 29 being interposed between the collar 28 and the sprocket wheel 20 to normally hold said collar axially away from the sprocket wheel. At one end of the collar 28 an internal conical surface is formed, which, by direct contact with a surface of the work blank A, provides the work rotating means. In order to release the rotating means from the work, a member 30 is provided which surrounds the collar 28 adjacent a flange. This member 30 may be moved periodically and automatically to withdraw the collar 28 from operative position. The movement of the member 30 surrounding the driving sleeve 19 and collar 28 I accomplish by a lever 31 engaging the rod 32 to which the member 30 is attached and which is adapted to be oscillated by a shaft 33. This in turn is operated from the lever 34 and connecting rod 35 shown also in Fig. 1, the lever 34 being connected with a lever 36 through an oscillating shaft 37. The opposite or free end of the lever 36 engages one of the cam strips 38 on the main cam drum 39 so that rotation of drum 39 oscillates the lever 36 and releases the work driver. It will be seen, therefore, that the sleeve 19 and collar 28 will be constantly rotated so long as the machine is being operated but that the work rotating collar 28 may be moved into and out of operative or driving position by periodic movements of the arm 31 and lever 36 controlled by the form of a cam strip 38 on the main cam drum 39. By the above means the work driver 28 may be retracted when work blanks A are being changed and moved into operative position as soon as a new blank is supplied.

The tailstock 15 is provided with a spindle or plunger 40 carrying the tailstock center 17, which plunger 40 periodically may be moved axially by automatic means. Preferably, this plunger 40 is resiliently forced toward its work engaging position by means of a spring 41, the tension of which is sufficient to properly support the work A in operative position and which may be readily adjusted by the adjusting screw 42 shown. To withdraw the center 17 from work engaging position to release the work A, a lever 43 on an oscillating shaft 44 mounted in the tailstock 15 is provided which may be operated through suitable means by cam strips or grooves on the main cam drum 39. These means comprise a lever or arm 45 also on the oscillatable shaft 44, a lever 46 on an oscillating shaft 47 being provided in engagement with the lever 45 by rod 48. Another arm 49 on the oscillating shaft 47 is also adapted to engage a cam strip 50 on the main cam drum. Oscillation of the arms 44 and 46 in one direction moves the plunger 40 away from operative position and movement of these arms in the opposite direction permits return movement of the tailstock plunger 40 into work engaging and supporting position. The form and position of the cam strip 50 on the main cam drum 39 is such that it operates the tailstock center to retract it when work blanks A are being changed and permits it to advance again as soon as a new blank has been positioned for engagement therewith.

The cam strips 38 and 50 on the main cam drum 39 for operating the tailstock spindle 40 and the rotating means 28 for the work in the headstock 14 are such and so placed that the rotating means 28 is released just before the tailstock spindle 40 is withdrawn. Also the rotating means 28 is held by the cam strip 38 in inoperative position until after the tailstock spindle 40 has been returned to its work engaging position. As both the rotating means 28 and the tailstock plunger 40 are held by springs 29 and 41 respectively in their operative position it is only necessary to engage the levers 36 and 49 with cams 38 and 50 during the short period that the rotating means 28 and plunger 40 are held in their inoperative positions.

In rear of the work supporting table 13 is a wheel carrying head 60 (see Figs. 8 to 11) which may be slidably mounted on horizontal ways 61 and 62 extending at right angles to the direction of the ways 11 and 12 for the work table 13. Preferably, I mount the head 60 to directly engage the ways 61 and 62 which are provided on a member 62ª rigidly and permanently secured to the base 10 and interpose intermediate slides 63 and 64 in the wheel head 60 and in the member 62ª respectively by means of which the position of the wheel head 60 may be accurately controlled in its movements toward or from its operative position. These parts will presently be described. On this wheel head 60 is a wheel mounting having a horizontal rotatable shaft 65 mounted in suitable bearings and on the shaft 65 is a grinding wheel 66.

In order to accurately maintain predetermined sizes and forms of the work A, it is essential to periodically dress the work engaging face of the grinding wheel 66. I therefore provide a dressing attachment most clearly shown in Figs. 1, 4, 5 and 8. This attachment comprises a slide 70 which preferably is mounted in ways provided on the upper portion of the wheel head 60. These ways extend exactly parallel to the axis of rotation of the wheel and means are provided in this wheel head 60 so that the slide 70 may be reciprocated by means of the hand wheel 71 shown. The hand wheel 71 is mounted on a shaft 72 having a pinion 73 thereon in engagement with a rack 74 mounted on the lower surface of the slide 70. Also mounted in the slide 70 is a vertically positioned bar 75 preferably splined thereto so that it may not rotate, and on the lower end of this bar 75 is fixed the dressing tool 76. This may comprise a diamond within a mounting, the vertical position of which may be varied as above described. A portion of the bar 75 is threaded so that by rotation of a hand wheel 77 surrounding the bar and which rotates a nut 78 engaging this threaded portion, the vertical position of the dressing tool 76 may be manually adjusted within fine limits.

One of the principal features of design in the present invention and by means of which high precision is obtained is the mechanism which controls the forward and rearward movements of the wheel head 60. It will be understood, of course, that it is essential to bring the work engaging surface of the wheel 66 forward to exactly identical positions as each successive article A is being operated upon. I therefore provide the ways 61 and 62 extending at right angles to the axis of the work supporting and rotating means and the ways 11 and 12 and provide corresponding ways on the wheel head 60 adapted to be engaged therewith. These have previously been referred to in a general way.

To provide a rigid stop for the wheel head 60 to positively limit its advancing movement at precisely identical positions with each cycle of operations, I provide at the extreme rear of the machine a small anvil 80 in the member 62ᵃ which is secured to and in effect forms a part of the base 10. This anvil 80 is adapted to contact with the forward end of an adjusting screw 82 rigidly but adjustably secured in the intermediate slide 63. This slide 63 is adjustable relatively to the wheel head 60 by rotation of a nut 83 on the screw 84 extending through the head 60 and fastened to the slide 63 by means of the projection 85 and clamping screw 86ᵃ. It will be seen, therefore, that readjustment of the screw 82 will permit this slide 63 and therefore the wheel head 60 to advance to a predetermined accurate forward position and thus the wheel 66 will be permitted to move forward a critical distance. By providing the anvil 80 in the member 62 and the adjusting screw 82 in the slide 63, all adjustments of the wheel head 60 relative to the slide 63 to compensate for wearing away of the wheel and for different sizes of wheel and work may be accomplished without resetting of the screw 82. When once set therefore the screw 82 does not require further adjustment.

Figure 4:
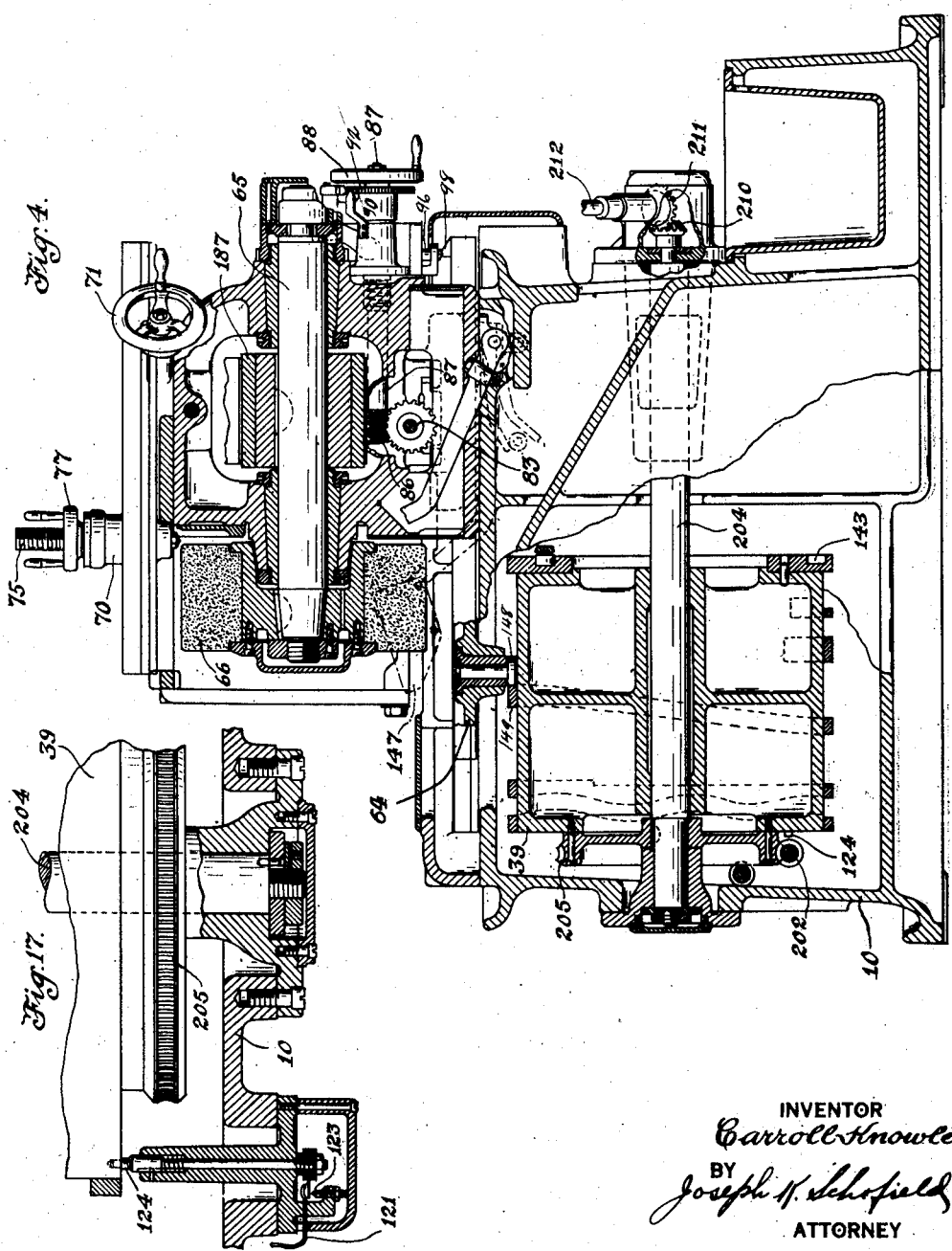
Fig. 4 is a front sectional view taken upon line 4—4 of Fig. 3.
Figure 10:
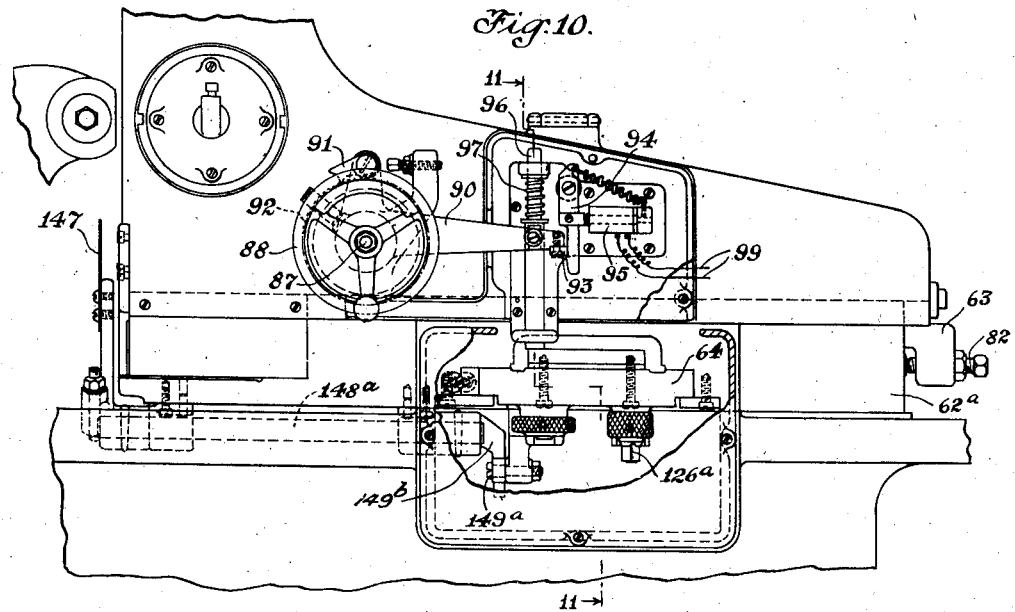
Fig. 10 is a side elevation of the wheel head showing the automatic feeding mechanism.
Figure 11:
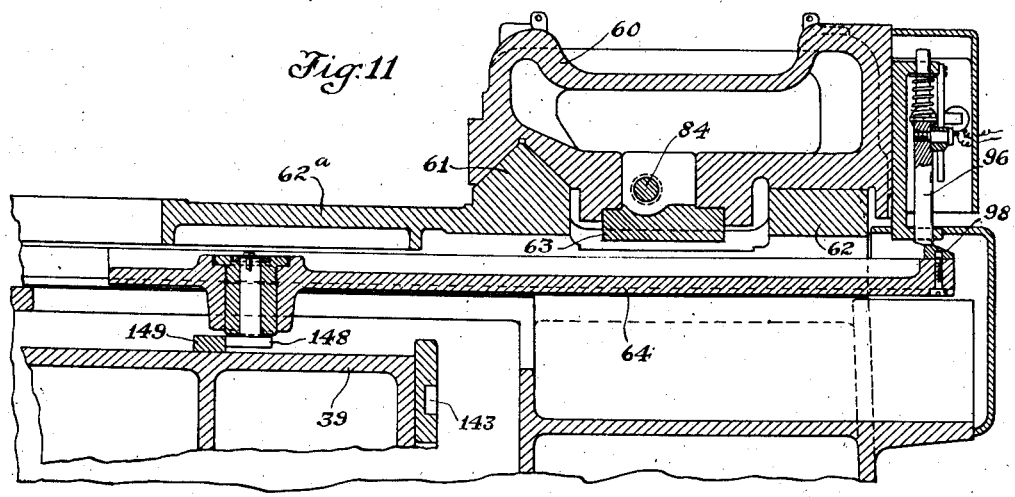
Fig. 11 is a sectional view taken on line 11—11 of Fig. 10.

To adjust the position of the wheel head 60 relative to this slide 63 to position the wheel 66 for different diameters of work A, the nut 83 above mentioned is provided on its periphery with teeth 85ᵃ so that rotation of the nut 83 may be accomplished readily to vary the relative positions of the slide and head. The nut 83 surrounding this threaded portion 84 is disposed between opposite walls on the wheel head 60 and therefore permits accurate adjustment of the head 60 for different sizes of work A or varying sizes of wheels 66. The periphery of the nut 83 formed with gear teeth 85ᵃ is in engagement with a worm 86 (see Fig. 4), the shaft 87 on which the worm 86 is mounted being extended to one side of the wheel head 60 and provided with a hand wheel 88 as shown in Figs. 4 and 10. By rotation of this shaft 87, the position of the wheel 66 may be varied to any desired distance from the axis about which the work A is rotated.

I also provide means for automatically and periodically taking up wear of the wheel by slight advancing movements of the wheel. This is accomplished by slight rotation of the shaft 87 by means of which the nut 83 on the adjusting screw 84 is controlled. This automatic wheel feeding means, which is used to maintain the wheel in a position to grind to a predetermined precise diameter, comprises the following mechanism as shown in Fig. 10. Loosely surrounding the shaft 87 is a member 90 having an arm on which is a pawl 91 adapted to engage a ratchet wheel 92 fast to the shaft 87 adjacent a hand wheel 88. On another extension of the member 90 is a small bearing plate 93 adapted to engage a finger 94 which may be oscillated into and out of engagement therewith by means of electromagnetic means 95. This arm of the member 90 has attached thereto a vertical rod 96 preferably urged downward by means of a coil spring 97. By movement of the actuating slide 64 controlling the movements of the wheel head 60, this vertical rod 96 is forced upward by engagement of its lower end with an inclined strip 98 on the slide 64. It will therefore be seen that with each reciprocation of the actuating slide 64, which occurs once for each cycle of operations, the vertical rod 96 may be raised and lowered. Normally during operation of the machine, after all preliminary adjustments have been made, and until appreciable wear of the wheel 66 occurs, the member 90 carrying the pawl 91 is retained by the oscillating finger 94 in its upper position. This also serves to hold the vertical rod or bar 96 in its uppermost position and thus no oscillating movement is induced in the member 90, and no feeding movement is given to the feed ratchet 92 and connected parts. However, as soon as appreciable wear has occurred on the wheel 66, the electro-magnet 95 adjacent the oscillating finger 94 is energized by an electric circuit including the wires 99 and withdraws this finger from engagement with the bearing plate 93 thus permitting the rod 96 to move downward and oscillate the pawl carrying member 90. Then, when the actuating slide 64 again makes its return movement, the oscillating member 90 is oscillated slightly in the opposite direction and the pawl 91 in engagement with the ratchet wheel 92 on the worm shaft 87 is rotated in a direction to rotate the nut 83 to feed the wheel 66 a small distance toward the work axis. This feeding movement takes place while the wheel head 60 is at the end of its forward movement and just after the slide 64 has started on its return movement. The feeding action therefore is not effective until the next forward movement of the wheel 66 which takes place when another work blank is being ground.

As the machine is particularly adapted for work of considerable length, I provide special means for supporting the work intermediate its length against the pressure of the abrasive wheel. This comprises the following mechanism: Mounted on the work supporting table 13 between the headstock 14 and tailstock 15 is a vertical support 100 between the side members of which is an oscillating member 101 adapted to normally engage the work A being ground. A spring 102 disposed between a portion of the support 100 and the oscillating member 101 provides means for forcing this member into engagement with the work. This mechanism is fully described and claimed in my Patent No. 1,568,673 granted January 5, 1926, so that it will not require describing in detail in this application. Suffice it to say that this oscillating or work engaging member 101 is provided with a member 101ᵃ that may be adjusted so that the oscillating member 101 may be adjusted for varying diameters.

It will be seen from this construction that with movements of the wheel head 60 away from the work A at the time a finished blank is being released and a new one engaged, this work engaging member or back rest 101 must temporarily be disengaged or withdrawn from the axis of the work rotating means. This is for the purpose of providing ample space for the transfer mechanism presently to be described, to move a blank into position to be engaged by these supporting and rotating means. I therefore provide an oscillating shaft 102 on the support 100 for the work engaging member 101 having arms or levers 103 and 104 fastened thereto, one of which, 103, extends upward and engages a forward vertical surface of the oscillating member 101. A downward extending arm 104 engages a member 105 adjustably attached to the forward end of the wheel head adjusting screw 84. This mechanism therefore oscillates the work engaging member 101 from its operative position simultaneously with movement of the wheel head 60 from its operative position. Advancing movement of the wheel head 60 oscillates the arms 103 and 104 and therefore permits movement of the work engaging member 101 into normal work engaging position. This mechanism is fully described and is claimed in my Patent No. 1,549,557 granted August 11, 1925.

Figure 6:
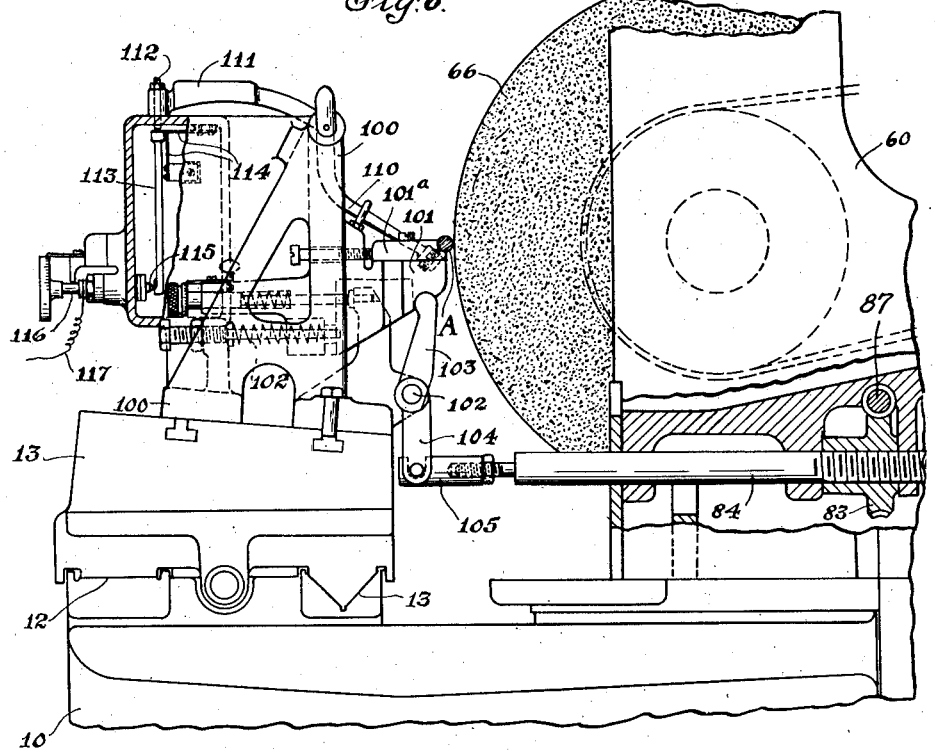
Fig. 6 is a side elevation of a portion of the machine showing the wheel head, work table and some of the parts mounted thereon.
Figure 7:
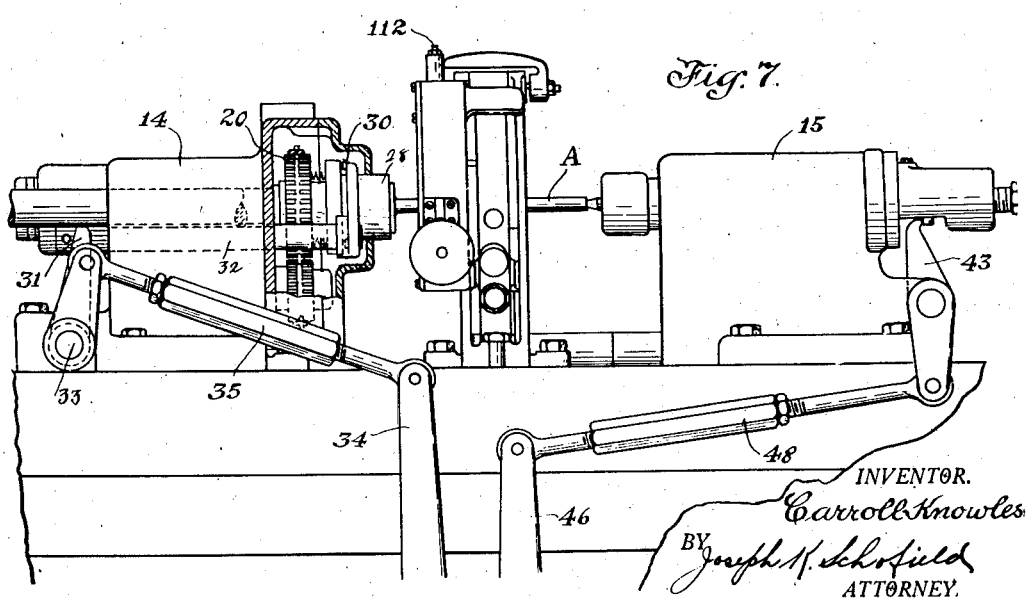
Fig. 7 is a front elevation of the work table and parts mounted thereon.

As I also provide a special form of sizing device whereby successive blanks may be maintained closely to identical size, I make use of the support 100 provided for the work engaging member 101 upon which to pivotally mount the feeler member 110 of this sizing device. This feeler member 110 which preferably is in the form of an oscillating arm, at its forward end has a small screw carrying at its point a diamond or other hard substance adapted to bear against the periphery of the work while being ground. An oppositely extending arm 111 of this member is provided with an adjusting screw 112 which bears against a lever 113 which is supported to oscillate about a fixed axis formed by flexible metallic strips 114 as shown in Fig. 6. An adjustable contact member 115 in the form of a pointed rod, the position of which may be varied by rotation of the screw 116 formed on a portion of its length, has a bearing point adjacent the free end of the pivoted lever 113. It will be seen from this construction that so long as the feeler arm 110 is in any position outside of a predetermined diameter for which the sizing device is set, the free end of the pivoted member 113 will be in contact with the adjustable pointed rod 115, but, as soon as the feeler arm 110 is oscillated to a predetermined position dependent upon the particular diameter being ground, the pointed end of the rod 115 and the end of the pivoted lever 113 are separated. So long as the adjustable rod 115 and the pivoted lever 113 are in contact, an electric circuit may be closed to energize the feed magnet 95 through a wire 117 which is in connection with one of the wires 99 extending from the magnet 95.

The electric circuit provided between the pointed rod 115 and the pivoted lever 113 is provided with, or connected to, a suitable source of electro-motive force, not shown. The magnet 95, the source of electro-motive force, the contact between lever 113 and rod 115 and another contact presently to be described are all connected in series. In this way, the electric circuit is closed only when both contacts are simultaneously closed and therefore no feeding of the wheel 66 takes place unless the feeler member 110 is held from oscillating to a predetermined distance from the work axis, in which case the lever 113 and rod 115 remain in contact.

It will be seen therefore that if the blank being ground is slightly oversize a contact will be made between the pivoted lever 113 and the pointed rod 115 which will energize the electro-magnet 95 through the circuit above described thus operating the wheel feeding mechanism 90 to advance the wheel 66, but, so long as the wheel 66 is not worn away and the blanks A continue to be of uniform predetermined size, contact will be broken between the pivoted lever 113 and the adjustable pointed rod 115 at the time the circuit would be otherwise energized so that no feed movement of the wheel 66 takes place.

As preferably the wheel 66 is retained in its advanced position during an appreciable interval of time during which the grinding operation is continued, I energize the electric circuit controlling the electro-magnet 95 at this time. It will be seen therefore that if the work blank A is not reduced to precisely predetermined size, the circuit will be completed through lever 113 and rod 115 and the feed mechanism actuated.

If it were not necessary to remove the oscillating member 101 and feeler arm 110 from operative positions when blanks A are being changed, the electric circuit could include merely the electro-magnet 95, the source of electro-motive force and the contact at the end of rod 115. However, as movement of the back rest 101 and feeler arm 110 are essential in the embodiment of the invention shown, I prefer to energize the electric circuit for an instant only at a time when the work is completely ground and just before the wheel slide 60 moves away from the work. For this purpose, I mount a contact 123 between the wires 117 and 99 in the electric circuit at a point adjacent the main cam drum 39 so that once during each revolution of the main cam drum, this contact may be closed by a projection 124 outstanding from the face of the cam drum 39. Closing of this contact closes the circuit and energizes the electro-magnet 95 and operates the feed if the contact between the pointed rod 115 and pivoted lever 113 is also closed. If however, the contact between lever 113 and rod 115 is not closed when contact is made by projection 124, which condition occurs when the work blank is ground precisely to predetermined size, no feeding action takes place.

It is obvious that to produce close duplication of work the slide 63 on which the wheel head 60 is mounted must be advanced to exactly the same point with each cycle of operations. In order to accomplish this, I make use of the following mechanism which is designed to actuate the slide 63 and head 60 in a predetermined timed relation with the operative movements of the other parts.

In the slide 64 I position a plate 125 placed within a recess thereof and clamp it in adjusted position by means of clamping wedges on screws 126 extending through the slide 64. Near one end the plate may oscillate slightly about the cylindrical pivot 127, which is fitted between the plate and a part of the slide 64. Preferably one of the screws 126 on which the adjusting wedges are mounted is provided with graduations 126$^a$ so that in conjunction with graduations on its clamping nut adjustments of the plate 125 within fine limits are possible.

Within the plate is an elongated slot 128, one part of which is substantially parallel to the direction of movement of the slide 64 and another portion at an angle thereto. It will be seen therefore that by engagement with the roller 128$^a$ depending from slide 63 on a stud 129 secured thereto that reciprocatory movement laterally of the slide 64 will advance and retract the slide 63 while the roller 128$^a$ is in engagement with the oblique portion of the slot 128. This mechanism is used to rapidly advance the wheel 66 toward the work and retract it therefrom. As the roller 128$^a$ is or may be subject to considerable wear and might adversely effect the precision of the mechanism, I provide special means between the slide 63 and plate 125 adapted to be in engagement during the grinding operation.

Mounted on the stud 129 in a position just above the roller is a circular member 129$^a$ of much larger size having a portion flattened as shown in Fig. 9. On the plate 125 adjacent the rear wall of the slot 128 is a bearing plate 130$^a$ adapted to contact with the flattened surface of the circular member 129$^a$. It is obvious therefore that while the slide 63 is in its advanced position during grinding, the bearing strip or plate 130$^a$ will engage the flat surface of the member 129$^a$. Also, by accurate adjustment of the plate 125 by means of the adjustment wedges and screws 126, the position of the bearing strip 130$^a$ may be adjusted so that movement of the slide 64 while the bearing strip 130$^a$ is engaged by the flat surfaced member 129$^a$ will advance the wheel head 60 an adjustable and extremely small amount during the feeding operation. Also, with the plate 125 securely clamped in adjusted position by the screws 126, movements of the slide 63 are always identical.

To actuate the slide 64, preferably through equal distances for each cycle of operation, a roller 148 is mounted to depend from its lower surface. This is positioned near one end of the slide 64 adjacent the main cam drum 39. On the cam drum are strips 149 so disposed that with rotation of the drum 39, the roller 148 and also the slide 64 will be forced to move back and forth through a distance determined by the position of the cam strips 149.

As the machine illustrated is adapted primarily for operation upon the valve stems and similar articles, I have devised and show a special form of magazine adapted to hold a plurality of these blanks suitably positioned to be automatically transferred into position for the grinding operation. This magazine comprises a continuously rotatable member formed of two circular side members in the form of ribbed wheels 130 and 131, the distance between which may be adjustable by means of the cross bars 132 shown. These circular members 130 and 131 are adapted to be mounted so as to be rotatable about a horizontal shaft 133. The shaft 133 on which the magazine members 130 and 131 are mounted is suitably supported upon a bracket member 134 adjustably secured to the work supporting table 13, this bracket member preferably extending to the outer periphery of the rotatable members.

Figure 5:
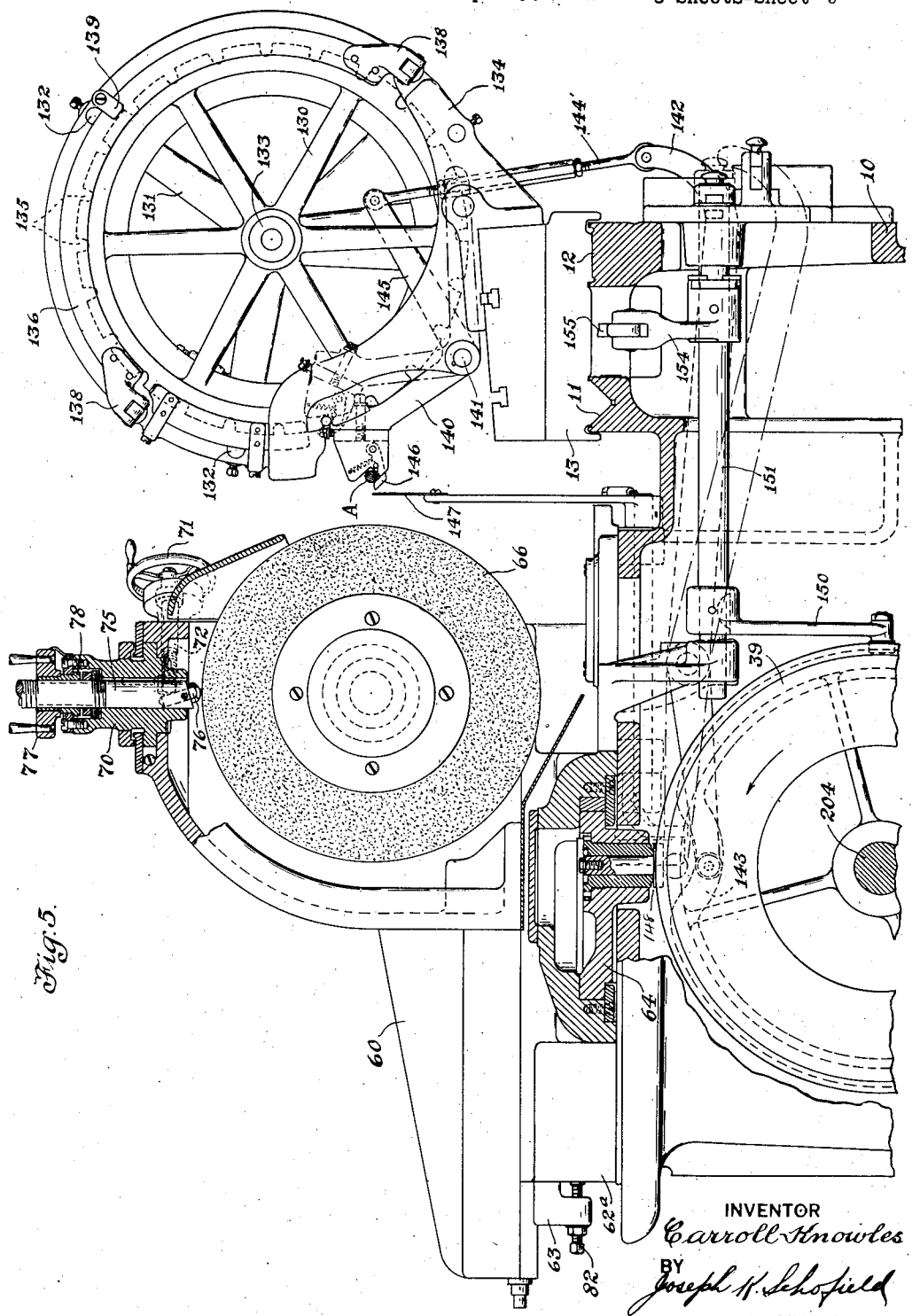
Fig. 5 is a vertical sectional view taken upon the line 5—5 of Fig. 1.

Spaced about the periphery of the two rotatable side members 130 and 131 of this magazine are aligned notches 135 or depressions in each of which one of the articles A to be ground may be disposed. As shown the articles may be retained in position by the semi-circular cover plate 136 surrounding the rotating members 130 and 131. In order to conveniently load the articles to be ground in the magazine this cover plate 136 is hinged as shown in Fig. 5 so that it may be swung outwardly on its hinges 138. With the plate 136 swung to its outermost position a plurality of the blanks A may be inserted in the magazine at a time. A catch 139 on the support 134 serves to retain the plate 136 in its closed position.

Cooperating with and located adjacent the magazine is the blank transferring mechanism adapted to receive a blank A from a pair of the depressions 135 in the rotatable members 130 and 131 and transfer it while held in a position parallel to the work supporting and rotating means into alignment therewith so that it may be automatically retained upon the supporting centers 16 and 17. On a portion of the magazine mechanism facing the grinding wheel 66 are arms 140 mounted on a horizontal oscillating shaft 141 which is mounted in suitable bearings in the support 134 for the magazine member. This shaft 141 may be oscillated by means of a lever 142 pivotally mounted in the base and adapted to be periodically oscillated by engagement of the inner end of this lever with a cam groove 143. Preferably this cam groove 143 is provided in a plate mounted in the face of the main cam drum 39. An adjustable reach arm 144 connects the lever 142 with an angular extension 145 provided on one of the arms 140. The arms 140 are adapted, in their retracted position, to be enclosed within the periphery of the side members 130 and 131 of the magazine and are each provided with a spring retained latch member 146 at their outer end which forms a depression to retain one of the articles A. While in this retracted position, continued rotation of the magazine as above described advances one of the articles into position to be supported on the outer end of the arms 140. Also at the time a finished blank is removed, the tailstock plunger 40 withdrawn and the wheel 66 retracted, the arms 140 are oscillated by means of their operating lever 142 to carry one of the articles A into operative position in alignment with the work supporting centers 16 and 17. While the new blank is being held in alignment with the work supporting means and after it has been engaged thereby the article carrying arms 140 are retracted, the latches 146 being deflected to permit the article to be released.

Adapted to operate at the time blanks are being changed is a guard member 147 so mounted that it may be moved to a position between the work A and the wheel 66. This is for the purpose of preventing the finished blank as it is released from the work supporting and rotating centers 16 and 17 from coming into contact with the wheel 66. An oscillating shaft 148$^a$ extending horizontally and rearwardly in the base 10 has an arm which at its forward end carries the guard 147. This preferably is in the form of a plate which, when the arm is oscillated to normal position, positions the guard plate 147 directly in advance of the wheel 66. At the rear end of the oscillating shaft 148 is a short arm 149$^b$ as shown in Figs. 4 and 10, this arm or projection 149$^b$ being so disposed and shaped that it may be engaged by a stud 149$^a$ mounted on a bracket depending from the wheel head actuating slide 64. As soon as the wheel head 60 moves away from the work A, the arm 149$^b$ is engaged by the stud thus elevating it slightly and moving the guard 147 to its operative position. The guard 147 is maintained in this position until the wheel head 60 starts forward during its next cycle at which time the guard 117 is depressed by oscillation of the shaft 148ª.

The machine disclosed in the drawings is of the broad wheel type in which the work engaging surface of the wheel 66 is substantially as wide as the part of the work being ground. It is usual, and preferable, in this type of machine to provide means for vibrating the work longitudinally or axially a short distance across the face of the wheel during the grinding operation. For this purpose a lever 150 (see Figs. 1 and 5) fixed to a shaft 151 is provided engaging cam strips 152 providing a groove of sinuous form on the main cam drum 39 so that the lever 150 and shaft 151 are oscillated back and forth a plurality of times each time the cam drum 39 is rotated. The shaft 151 is provided with another lever or arm 154 which is connected to a connecting rod 155, the opposite end of which is fastened to the lower surface of the table 13. It will be seen, therefore, that during operation, and while the main cam drum 39 is slowly rotating, the work A is vibrated back and forth a short distance represented by the amount of oscillation given to the cam engaging arm 150.

Preferably the connection between the rod 155 and the table 13 is adjustable so that the position of the table 13 may be varied longitudinally and the work A conveniently adjusted relative to the wheel 66 which moves in a fixed path normal to the direction of movement of the table 13. I therefore provide ways on the lower surface of the table 13 and slidably mount a block 156 therein. It is to this block 156 that the end of the connecting rod 155 is fastened, the block 156 being adjustable along the ways by means of a screw 157 threaded into the block 155 and rotatably mounted in the table 13. A hand wheel 158 on the screw 157 permits easy adjustment of the block 155 and therefore the table 13.

As there are some types of work which do not permit or require the vibratory movement of the table 13 relative to the wheel 66, I provide means for disconnecting this mechanism. The forward end of oscillating shaft 151 is provided with an extension 151ª, movement in a forward direction of which disengages the arm 150 from the cam path 152 and locks shaft 151 in position. A small slide 152ª is adapted to engage one or the other of notches provided in the extension 151ª to hold the shaft 151 in either its forward or rearward position and render the vibratory mechanism operative or inoperative.

As the embodiment of the invention selected for illustration is of the full automatic type, it is desirable to provide means for stopping operation of the machine after any desired number of articles have been completed, this permits the operator to periodically dress the face of the wheel and make additional necessary adjustments to maintain precisely identical sizes of the work. Also it permits the operator to set the machine to operate on the number of blanks which may be in the magazine, so that as soon as the magazine has been exhausted of blanks the machine will be stopped. With each supply of blanks to the magazine the automatic stop may be set ahead a corresponding amount.

In order to operate this mechanism to stop the machine, I mount a rod 170 on the tailstock operating lever 46 which is provided with a pawl 171 in engagement with a ratchet wheel 172 fixed rotatably to a stud 173 outstanding from the forward vertical surface of the machine. This is shown in Figs. 1, 15 and 16. It will be seen, therefore, that each time the tailstock plunger 40 is withdrawn from the work to permit removal and replacement of the blanks that this rod 170 will be reciprocated a short distance sufficient to rotate the ratchet wheel 172 through a space represented by one or more of its teeth. Another pawl 174 mounted on the frame of the machine holds the ratchet wheel 172 from retrograde rotation. A pin 175 is fixed to the inner face of the ratchet wheel 172 which may be bevelled to permit its engaging and oscillating a lever 176 pivotally mounted adjacent the ratchet wheel 172. This lever 176 at one end is provided with a latch 176ª which engages over a projection on the main operating lever 177 when this lever is in its operative position, and, as soon as the pin 175 strikes against the opposite extension of this lever 176, the lever 176 is oscillated sufficiently to release the operating lever 177 which is immediately and automatically moved by means of a spring 178 to inoperative position thus releasing a main driving clutch 179 and stopping further operation of the machine.

In order to set the machine to stop after any desired or predetermined number of articles have been completed, it is only necessary to rotate this ratchet wheel in an anti-clockwise direction far enough so that operation on a definite number of articles will cause the ratchet wheel 172 to move to its operating position with the pin 175 in engagement with the lever 176. For convenience the ratchet wheel 172 is provided with graduations indicating the number of articles for which it is set.

The main operative mechanism having now been referred to, the means by which their movements are controlled in timed relation to each other as well as the means by which they are operated will now be described.

The main driving means for the machine comprises a horizontal shaft 180 in rear of the machine which may be driven by a belt 181 passing around a pulley 182 on this driving shaft. Also on this main driving shaft 180 is another pulley 183 fast thereto over which extends a belt 184 passing over idler pulleys 185 on a vertically extending arm 186 and then over a pulley 187 fast to the shaft 65 on which the wheel 66 is mounted within the wheel head 60 as previously described. It will be seen, therefore, that whenever the main driving shaft 180 and pulley 183 are rotated, the grinding wheel 66 also will be rotated. A belt tensioning device is also provided by means of which the wheel driving belt 184 may be maintained properly under the necessary tension. This comprises the vertically extending arm 186 previously referred to connected to an adjustable reach arm 188 by means of which the vertical arm 186 may be positioned toward or from the wheel driving pulley 187.

Also on the main driving shaft is the clutch 179 previously referred to having a member 190 adapted to be engaged by a corresponding clutch member 191 by axial movement of the second clutch member. When the clutch members 190 and 191 are in driving position, a shaft 192 in alignment with the main driving shaft 180 is rotated on which is a driving pulley 193 near one end. This pulley 193 is provided with the belt 23 extending over the pulley 24 on the short horizontal shaft 196 in the forward lower portion of the base 10 of the machine. On this short shaft 196 is a small pulley 25 adapted to drive the belt 22 extending over a pulley 26 on the driving shaft 21 on the work supporting table 13 for the work rotating member 28. Also on this lower horizontal shaft 196 is a bevel gear 200 in mesh with a corresponding bevel gear 201 on a rearwardly extending horizontal shaft 202 provided in an intermediate portion with a worm 203 preferably integral therewith.

A main cam shaft 204 on which is mounted the main cam drum 39 previously referred to and by means of which the different mechanisms are operated in timed relation to each other, is provided lying horizontally within the mid-portion of the base 10. On this main cam shaft 204 is a worm wheel 205, preferably attached as shown in Fig. 4, to one of the side faces of the main cam drum 39. This worm wheel 205 is in mesh with the worm 203 on the horizontally extending shaft 202, so that rotation of this shaft 202 rotates the main cam shaft 204 and cam drum 39.

At the opposite end of the main cam shaft 204 is a bevel gear 210 in mesh with a corresponding bevel gear 211 on an extension shaft 212, the opposite or upper end of which is provided with a bevel gear 213 which is supported in position on one end of the work supporting table 13. In mesh with this bevel gear 213 is a corresponding bevel gear 214 which is mounted on a shaft 215 extending along the table 13 and provided with a small spur gear 216 in mesh with a large spur gear 217 mounted on one of the side members 131 of the blank carrying magazine. Rotation of this shaft 215 and pinion 216 by rotation of the main cam shaft 204 rotates the magazine 130 in timed relation to the rotation of the main cam drum 39.

The ratio between the gears 210 and 211, 213 and 214 and 216 and 217 is such that during one revolution of the main cam drum 39, which occurs once during each cycle of operations, the circular members 130 and 131 of the magazine are rotated through an angle subtended by adjacent depressions 135. This movement therefore is sufficient to advance a new blank to be engaged by the transfer arms 140 with each cycle of operation.

It will thus be seen that when the main driving clutch 179 is in its driving position, the movable mechanisms of the machine are operated, all of which operations are maintained in timed relation to each other.

What I claim is:

1. A grinding machine comprising in combination, a base, blank supporting and rotating means thereon, a wheel slide having a rotatable wheel thereon adapted to be moved toward and from the work, an intermediate slide movable transversely to the direction of movement of the wheel slide, a cam plate on said slide having a curved slot therein, means movable with the wheel slide engaging said cam, means whereby the movement of the wheel slide may be varied relative to the movement of the intermediate slide, and means to adjust the position of the wheel slide relative to the means movable therewith whereby the position of the wheel slide may be varied for different diameters of blanks.

2. A grinding machine comprising in combination, a base, blank supporting and rotating means thereon, a wheel slide having a rotatable wheel thereon adapted to be moved toward and from the work, an intermediate slide movable transversely to the direction of movement of the wheel slide, a cam plate on said slide having a curved slot therein, means movable with the wheel slide engaging said cam, means whereby the movement of the wheel slide may be varied relative to the movement of the intermediate slide, and screw and nut means to adjust the position of the wheel slide relative to the means movable therewith whereby the operative position of the wheel slide may be varied for different diameters of blanks.

3. A grinding machine comprising in combination, a base, blank supporting and rotating means thereon, a wheel slide having a rotatable wheel thereon adapted to be moved toward and from the work, an intermediate slide movable transversely to the direction of movement of the wheel slide, a cam plate on said slide having a curved slot therein, means movable with the wheel slide engaging said cam, means whereby the movement of the wheel slide may be varied relative to the movement of the intermediate slide, and automatic feeding means to vary the position of the wheel slide relative to the means movable therewith.

4. A grinding machine comprising in combination, a base, blank supporting and rotating means thereon, a wheel slide having a rotatable wheel thereon adapted to be moved toward and from the work, an intermediate slide movable transversely to the direction of movement of the wheel slide, a cam plate on said slide having a curved slot therein, means movable with the wheel slide engaging said cam, means whereby the movement of the wheel slide may be varied relative to the movement of the intermediate slide, and automatic feeding means acting directly upon said wheel slide to vary the position of the wheel slide relative to the means movable therewith whereby the position of the wheel slide may be periodically advanced to compensate for wheel wear.

5. An automatic grinding machine comprising in combination, a base, a work carrying table mounted thereon, a wheel slide having a rotatable abrasive wheel thereon adapted to move toward and from work mounted on said table, an actuating slide in said base movable in a direction at right angles to the direction of movement of the wheel slide, means to reciprocate said latter slide, an adjustable plate having a slot therein mounted on said actuating slide, and means secured to the wheel slide and engaging the walls of the slot whereby movement of said actuating slide moves the wheel slide toward and from the work.

6. An automatic grinding machine comprising in combination, a base, a work carrying table mounted thereon, a wheel slide having a rotatable abrasive wheel thereon adapted to move toward and from work mounted on said table, an actuating slide in said base movable in a direction at right angles to the direction of movement of the wheel slide, cam means to reciprocate said latter slide through a constant distance, an adjustable plate having a slot therein mounted on said actuating slide, and means secured to the wheel slide and engaging the walls of the slot whereby movement of said actuating slide moves the wheel slide toward and from the work.

7. An automatic grinding machine comprising in combination, a base, a work carrying table mounted thereon, a wheel slide having a rotatable abrasive wheel thereon adapted to move toward and from work mounted on said table, an actuating slide in said base movable in a direction at right angles to the direction of movement of the wheel slide, cam means to reciprocate said latter slide, an adjustable plate having an angular slot therein mounted on said actuating slide, and a roller secured to the wheel slide and engaging the walls of the slot whereby movement of said actuating slide moves the wheel slide toward and from the work at different speeds during different portions of its stroke.

8. An automatic grinding machine comprising in combination, a base, a work carrying table mounted thereon, a wheel slide having a rotatable abrasive wheel thereon adapted to move toward and from the wheel mounted on said table, an actuating slide for said wheel slide, an adjustable plate mounted thereon having a slot therein, a bearing strip on said plate adjacent the slot, and means adjustably secured to the wheel slide adapted to engage an edge of said slot during the rapid forward and rearward movements of the slide and another member on said wheel slide adapted to engage the bearing strip during the grinding operation.

9. An automatic grinding machine comprising in combination, a base, a work carrying table mounted thereon, a wheel slide having a rotatable abrasive wheel thereon, an actuating slide for said wheel movable in a direction at right angles to the direction of movement of the wheel slide, an adjustable plate on said actuating slide having bearing portions, means depending from the wheel slide and engaging said bearing portions, one of said means comprising a roller adapted to engage one of said bearing portions and the other means comprising a member having a flat surfaced portion adapted to engage a bearing strip fixed to the plate.

10. An automatic grinding machine comprising in combination, a base, a work carrying table mounted thereon, a wheel slide having a rotatable abrasive wheel thereon, an actuating slide for said wheel slide movable in a direction at right angles to the direction of movement of the wheel slide, an adjustable plate on said actuating slide having bearing portions comprising a slot and a bearing strip parallel to a portion thereof, means depending from the wheel slide and engaging said bearing portions, one of said means comprising a roller adapted to engage the walls of said slot and the other means comprising a member having a flat surfaced portion adapted to engage the bearing strip fixed to the plate.

11. An automatic grinding machine comprising in combination, a base, a work carrying table mounted thereon, a wheel slide having a rotatable abrasive wheel thereon, an actuating slide for said wheel slide movable in a direction at right angles to the direction of movement of the wheel slide, a plate thereon having a slot therein, means on the wheel slide engaging the walls of the slot to move the wheel slide, and means to adjust the angular position of said plate to vary the position of the slot, said means comprising a member about which the plate may be oscillated and an adjustable wedge and clamping member whereby the plate may be rigidly held in any adjusted position.

12. An automatic grinding machine comprising in combination, a base, a work carrying table mounted thereon, a wheel slide having a rotatable abrasive wheel thereon, an actuating slide for said wheel slide movable in a direction at right angles to the direction of movement of the wheel slide, a plate thereon having an angular slot therein, means on the wheel slide engaging the walls of the slot to move the wheel slide, and means to adjust the angular position of said plate about a pivot to vary the position of the slot comprising a member about which the plate may be oscillated and an adjustable wedge having graduations thereon and a clamping member whereby the plate may be rigidly held in any adjusted position.

13. An automatic grinding machine comprising in combination, a base, a work carrying table thereon, a wheel slide having a rotatable wheel thereon adapted to be moved toward and from work on said table, automatically operating work blank releasing mechanism adapted to permit disengagement of a blank from operative position on the table, a movable guard plate, and means to periodically move said plate to a position between the work blank and the wheel.

14. An automatic grinding machine comprising in combination, a base, a work carrying table thereon, a wheel slide having a rotatable wheel thereon adapted to be moved toward and from work on said table, automatically operating work blank releasing mechanism adapted to permit disengagement of a blank from operative position on the table, a movable guard plate, and means operated by movement of the wheel slide to move said plate to a position between the work blank and the wheel simultaneously with movement of the wheel away from the work.

15. An automatic grinding machine comprising in combination, a base, a work carrying table thereon, a wheel slide having a rotatable wheel thereon adapted to be moved toward and from work on said table, automatically operating work blank releasing mechanism adapted to permit disengagement of a blank from operative position on the table, an oscillating guard plate, and means to periodically oscillate said plate to a position between the work blank and the wheel.

16. An automatic grinding machine comprising in combination, a base, a work carrying table thereon, a wheel slide having a rotatable wheel thereon adapted to be moved toward and from work on said table, means to automatically release a finished blank and transfer a new blank to operative position on the table, a movable guard plate, and means operated simultaneously with movement of the wheel slide to move said guard into operative position between the wheel and work blank and retain it in operative position while the blank releasing and transferring means are completing their operations.

17. A blank supplying mechanism for cylindrical grinding machines comprising in combination, a support, a pair of rotatable blank carrying members thereon, means to slowly and continuously rotate said members, an oscillating arm mounted adjacent said rotatable members, and means to periodically oscillate said arm to move a blank from said rotatable members into operative position on the machine.

18. A blank supplying mechanism for cylindrical grinding machines comprising in combination, a support, a pair of rotatable blank carrying members thereon, means to vary the distance apart of said members to accommodate blanks of different sizes, means to slowly and continuously rotate said members, an oscillating arm mounted adjacent said rotatable members, and means to periodically oscillate said arm to move a blank from said rotatable members into operative position on the machine.

19. A blank supplying mechanism for cylindrical grinding machines comprising in combination, a support, a pair of rotatable blank carrying members thereon, means to retain blanks in spaced positions thereon, means to slowly and continuously rotate said members, an oscillating arm mounted adjacent said rotatable members, and means to periodically oscillate said arm to move a blank from said rotatable members into operative position on the machine.

20. A blank supplying mechanism for cylindrical grinding machines comprising in combination, a support, a pair of rotatable blank carrying members thereon, means to vary the distance apart of said members to accommodate blanks of different sizes, a movable cover strip adjacent one of said members to permit insertion of a plurality of blanks, means to slowly and continuously rotate said members, an oscillating arm mounted adjacent said rotatable members, and means to periodically oscillate said arm to move a blank from said rotatable membeds into operative position on the machine.

21. A blank supplying mechanism for cylindrical grinding machines comprising in combination, a support, a pair of rotatable blank carrying members thereon having blank retaining means thereon adapted to hold a plurality of blanks in spaced relation to each other about portions of the peripheries of the members, means to slowly and continuously rotate said members, a movable cover strip to permit insertion of a plurality of blanks, an oscillating arm mounted adjacent said rotatable members, and means to periodically oscillate said arm to move a blank from said rotatable members into operative position on the machine.

22. A blank supplying mechanism for cylindrical grinding machines comprising in combination, a support, a pair of rotatable blank carrying members thereon having blank retaining means thereon adapted to hold a plurality of blanks in spaced relation to each other about portions of the peripheries of the members, a shaft parallel to the axis of rotation of the work on which said members are mounted, means to slowly and continuously rotate said members, an oscillating arm mounted adjacent said rotatable members, and means to periodically oscillate said arm to move a blank from said rotatable members into operative position on the machine.

23. A blank supplying mechanism for cylindrical grinding machines comprising in combination, a support, a pair of rotatable blank carrying members thereon having blank retaining means thereon adapted to hold a plurality of blanks in spaced relation to each other about portions of the peripheries of the members, gear driven means to slowly and continuously rotate said members, an oscillating arm mounted adjacent said rotatable members, and means to periodically oscillate said arm to move a blank from said rotatable members into operative position on the machine.

24. A blank supplying mechanism for cylindrical grinding machines comprising in combination, a support, a pair of rotatable blank carrying members thereon having blank retaining means thereon adapted to hold a plurality of blanks in spaced relation to each other about portions of the peripheries of the members, means to slowly and continuously rotate said members, an oscillating arm mounted adjacent said rotatable members, and means to periodically oscillate said arm to move a blank from said rotatable members into operative position on the machine, said means to rotate the blank carrying members and means to oscillate the arm being operated in timed relation to each other.

25. A blank supplying mechanism for cylindrical grinding machines comprising in combination, a support adapted to be mounted on a work table of said machine, a shaft fixed to said support, two blank carrying members on said shaft adapted to be rotated together, blank retaining means on said members adapted to hold blanks in spaced relation to each other and advance them into position to be engaged by a transfer mechanism, and means to continuously rotate said blank carrying members to position blanks adjacent said transfer mechanism.

26. A blank supplying mechanism for cylindrical grinding machines comprising in combination, a support, a pair of rotatable blank carrying members thereon having blank retaining means thereon adapted to hold a plurality of blanks in spaced relation to each other about portions of the peripheries of the members, means to slowly and continuously rotate said members, an oscillating arm mounted adjacent said rotatable members, means to periodically oscillate said arm to move a blank from said rotatable members into operative position on the machine, a gear fixed to one of said rotatable members, a pinion in mesh therewith, and continuously operating means to rotate the pinion and rotatable members.

27. An automatic grinding machine comprising in combination, a base, a table slidably mounted thereon, work blank supporting and rotating means on said table, a work blank carrying magazine on said table, transfer mechanism comprising an oscillating arm supported on said table, and means to periodically operate said transfer mechanism to advance a work blank from said magazine to operative position to be engaged by said supporting and rotating means.

28. An automatic grinding machine comprising in combination, a base, a table slidably mounted thereon, work blank supporting and rotating means on said table, a constantly rotating work blank carrying magazine on said table, transfer mechanism comprising an oscillating arm supported on said table, and means to periodically operate said transfer mechanism to advance a work blank from said magazine to operative position to be engaged by said supporting and rotating means.

29. An automatic grinding machine comprising in combination, a base, a table slidably mounted thereon, work blank supporting and rotating means on said table, a work blank carrying magazine on said table, transfer mechanism comprising an oscillating arm supported on said table, and means to periodically operate said transfer mechanism to advance a work blank from said magazine to operative position to be engaged by said supporting and rotating means, and operating means for said mechanisms comprising a main cam shaft, 30. An automatic grinding machine comprising in combination, a base, a table slidably mounted thereon, work blank supporting and rotating means on said table, a work blank carrying magazine on said table, transfer mechanism comprising an oscillating arm supported on said table, means to periodically operate said transfer mechanism to advance a work blank from said magazine to operative position to be engaged by said supporting and rotating means, and means comprising a main cam shaft and driving connections to constantly rotate said magazine and to operate the transfer mechanism.

31. An automatic grinding machine comprising in combination, a base, a table slidably mounted thereon, work blank supporting and rotating means on said table, a work blank carrying magazine on said table, transfer mechanism comprising an oscillating arm supported on said table, means to periodically operate said transfer mechanism to advance a work blank from said magazine to operative position to be engaged by said supporting and rotating means, and means comprising a main cam shaft and positively driven connections to constantly rotate said magazine to advance a blank into position to be engaged by said transfer mechanism.

32. An automatic grinding machine comprising in combination, a base, a table slidably mounted thereon, blank supporting and rotating means on said table comprising a headstock center and a tailstock center, means to automatically actuate the tailstock, a work blank carrying magazine on said table, transfer mechanism comprising an oscillating arm supported on said table, means to rotate said magazine, and means to periodically advance a work blank from said magazine to operative position on the supporting and rotating centers.

33. An automatic grinding machine comprising in combination, a base, a table slidably mounted thereon, blank supporting and rotating means on said table comprising a headstock center and a tailstock center, means to automatically actuate the tailstock, a constantly rotating work blank carrying magazine comprising two adjustable circular members on said table, transfer mechanism comprising an oscillating arm supported on said table, means to rotate said circular members, and means to periodically advance a work blank from said magazine to operative position on the supporting and rotating centers.

34. An automatic grinding machine comprising in combination, a base, a table slidably mounted thereon, blank supporting and rotating means on said table, automatic means to operate said means to engage and disengage blanks, a wheel slide having a rotatable wheel thereon, automatic means to actuate the wheel and wheel slide toward and from the work, a blank carrying magazine, an oscillating arm adjacent thereto adapted to transfer a blank from said magazine to a position to be engaged by said supporting and rotating means, and a main cam shaft having cam means thereon to actuate the blank engaging means, the wheel slide actuating means, and the transfer means in timed relation to each other.

35. An automatic grinding machine comprising in combination, a base, a table slidably mounted thereon, blank supporting and rotating means on said table, automatic means to operate said means to engage and disengage blanks, a wheel slide having a rotatable wheel thereon, automatic means to actuate the wheel and wheel slide toward and from the work, a blank carrying magazine on the table, an oscillating arm on the table adjacent thereto adapted to transfer a blank from said magazine to a position to be engaged by said supporting and rotating means, and a main cam shaft having cam means thereon to actuate the blank engaging means, the wheel slide actuating means and the transfer means in timed relation to each other.

36. An automatic grinding machine comprising in combination, a base, a table slidably mounted thereon, blank supporting and rotating means on said table, automatic means to operate said means to engage and disengage blanks, a wheel slide having a rotatable wheel thereon, automatic means to actuate the wheel and wheel slide toward and from the work, a blank carrying magazine, an oscillating arm adjacent thereto adapted to transfer a blank from said magazine to a position to be engaged by said supporting and rotating means, a main cam shaft having cam means thereon to actuate the supporting and rotating means, the wheel slide actuating means and the transfer means in timed relation to each other, and means driven from said cam shaft for rotating said magazine.

37. An automatic grinding machine comprising in combination, a base, a table slidably mounted thereon, work supporting and rotating means on said table, a wheel slide on said base movable at right angles to the direction of movement of said table, a rotatable wheel on said slide, a blank carrying magazine on said table, transfer mechanism adapted to engage a work blank on said magazine and move it into position to be engaged by said work supporting and rotating means, a rotatable cam shaft in said base, and means associated with said cam shaft to operate said magazine, said transfer mechanism, wheel slide, table reciprocating mechanism and work engaging mechanism, said mechanisms being operated in accordance with a predetermined cycle.

38. An automatic grinding machine comprising in combination, a base, a table slidably mounted thereon, work supporting and rotating means on said table, a wheel slide on said base movable at right angles to the direction of movement of said table, a rotatable wheel on said slide, a constantly rotating blank carrying magazine on said table, transfer mechanism mounted on the table adapted to engage a work blank within said magazine and move it into position to be engaged by said work supporting and rotating means, a rotatable cam shaft in said base, and means associated with said cam shaft to operate said transfer mechanism, wheel slide, moving mechanism, table reciprocating mechanism and work supporting and rotating mechanism, said mechanisms being operated in accordance with a predetermined cycle.

39. An automatic grinding machine comprising in combination, a base, a work carrying table slidably mounted thereon, a wheel slide having a rotatable wheel thereon movable toward and from work mounted on said table, an automatically operated sizing device comprising a work engaging member, a wheel feeding mechanism comprising a rotating wheel and a pawl adjacent thereto, electro-magnetic means adapted to actuate said pawl and operate said feeding mechanism, and means mounted on a rotating member of said grinding machine and adapted to energize the electro-magnetic means during a portion of a cycle of operations and when the work engaging member is in a predetermined position.

40. An automaitc grinding machine comprising in combination, a base, a work carrying table slidably mounted thereon, a wheel slide having a rotatable wheel thereon movable toward and from work mounted on said table, an automatically operated sizing device comprising an oscillating member adapted to engage the work and mounted on the work carrying table, a wheel feeding mechanism comprising a rotating wheel and a pawl adjacent thereto, electro-magnetic means adapted to actuate said pawl and operate said feeding mechanism, and means mounted on a rotating member of said grinding machine and adapted to energize the electro-magnetic means during a portion of a cycle of operations and when the work engaging member is in a predetermined position.

41. An automatic grinding machine comprising in combination, a base, a work carrying table slidably mounted thereon, a wheel slide having a rotatable wheel thereon movable toward and from work mounted on said table, an automatically operated sizing device comprising a work engaging member, a wheel feeding mechanism comprising a rotating wheel and a pawl adjacent thereto, electro-magnetic means adapted to actuate said pawl and operate said feeding mechanism, and means mounted on a rotating member of said grinding machine and adapted to energize the electro-magnetic means when the wheel slide is in its advanced position and when the work engaging member is in a predetermined position.

42. An automatic grinding machine comprising in combination, a base, a work carrying table slidably mounted thereon, a wheel slide having a rotatable wheel thereon movable toward and from work mounted on said table, a main cam shaft on said machine adapted to rotate once during each cycle of operation controlling the movements of said table and slide, an automatically operating sizing device comprising a work engaging member, a wheel feeding mechanism, electro-magnetic means to actuate the wheel feeding mechanism, and means on said cam shaft adapted to momentarily energize the electro-magnetic means during the cycle of operations when the work engaging member is in a predetermined position.

43. An automatic grinding machine comprising in combination, a work carrying table, a wheel head having a rotatable abrasive wheel thereon, means to move the wheel and table relative to each other to cause grinding upon work mounted on said table, automatic means to transfer work blanks from a magazine to operative position on the table, and means to automatically discontinue grinding operations after a predetermined number of blanks have been ground.

44. An automatic grinding machine comprising in combination, a work carrying table, a wheel head having a rotatable abrasive wheel thereon, means to move said wheel and table relative to each other to cause grinding operations on work mounted on said table, automatic means to transfer work blanks from a magazine to operative position on said table, automatic means to support and rotate said work blanks in operative position, and means operated by said supporting means to automatically discontinue grinding operations after a predetermined number of blanks have been ground.

45. An automatic grinding machine comprising in combination, a work carrying table, a wheel head having a rotatable abrasive wheel thereon, means to move said wheel and table relatively to each other to cause grinding operations on work mounted on said table, automatic means to transfer work blanks from a magazine to operative position on the table, a tailstock having a spindle therein, automatic means to operate said tailstock spindle to support work in erative position on said table, and means operated by movement of said tailstock operating mechanism to discontinue grinding operations after a predetermined number of blanks have been ground.

46. An automatic grinding machine comprising in combination, a work carrying table, a wheel head having a rotatable abrasive wheel thereon, means to move the wheel and table relative to each other to cause grinding upon work mounted on said table, automatic means to transfer work blanks from a magazine to operative position on the table, means to automatically discontinue grinding operations after a predetermined number of blanks have been ground, and means to position said last mentioned means to stop the grinding operations after any predetermined number of blanks have been ground.

47. An automatic grinding machine comprising in combination, a work carrying table, a wheel head having a rotatable abrasive wheel thereon, means to move the wheel and table relative to each other to cause grinding upon work mounted on said table, automatic means to transfer work blanks from a magazine to operative position on the table, a dial, means periodically operated to advance the dial, and means on the dial to stop operation of the machine after any predetermined number of blanks have been ground.

In testimony whereof, I hereto affix my signature.

CARROLL KNOWLES.